United States Patent
Dawson et al.

(10) Patent No.: US 10,982,128 B2
(45) Date of Patent: Apr. 20, 2021

(54) METHOD FOR MAKING A TREATMENT FLUID COMPRISING A DIVERTING AGENT IN FLAKE FORM, AND METHOD OF TREATING A WELL

(71) Applicant: Independence Oilfield Chemicals LLC, The Woodlands, TX (US)

(72) Inventors: Jeffrey C. Dawson, Conroe, TX (US); John R. Willingham, Cypress, TX (US); Richard Mitchell, Houston, TX (US)

(73) Assignee: INDEPENDENCE OILFIELD CHEMICALS LLC, The Woodlands, TX (US)

( * ) Notice: Subject to any disclaimer, the term of this patent is extended or adjusted under 35 U.S.C. 154(b) by 2 days.

(21) Appl. No.: 16/322,643

(22) PCT Filed: Jul. 14, 2017

(86) PCT No.: PCT/GB2017/052078
§ 371 (c)(1),
(2) Date: Feb. 1, 2019

(87) PCT Pub. No.: WO2018/025011
PCT Pub. Date: Feb. 8, 2018

(65) Prior Publication Data
US 2020/0131428 A1    Apr. 30, 2020

Related U.S. Application Data

(60) Provisional application No. 62/369,425, filed on Aug. 1, 2016.

(51) Int. Cl.
| | | |
|---|---|---|
| C09K 8/514 | (2006.01) | |
| C09K 8/512 | (2006.01) | |
| C09K 8/68 | (2006.01) | |
| C09K 8/80 | (2006.01) | |
| E21B 33/138 | (2006.01) | |
| E21B 43/267 | (2006.01) | |

(52) U.S. Cl.
CPC .............. *C09K 8/512* (2013.01); *C09K 8/514* (2013.01); *C09K 8/685* (2013.01); *C09K 8/80* (2013.01); *E21B 33/138* (2013.01); *E21B 43/267* (2013.01)

(58) Field of Classification Search
None
See application file for complete search history.

(56) References Cited

U.S. PATENT DOCUMENTS

| | | | | |
|---|---|---|---|---|
| 4,269,975 A | * | 5/1981 | Rutenberg | ........... C08B 37/0096 536/114 |
| 7,550,412 B2 | * | 6/2009 | Morgan | .............. C08B 37/0096 426/629 |

(Continued)

*Primary Examiner* — Andrew Sue-Ako
(74) *Attorney, Agent, or Firm* — Shumaker, Loop & Kendrick, LLP

(57) ABSTRACT

A method of treating a subterranean formation penetrated by a well-bore, for example to facilitate fracturing of the formation, comprises the steps of: (i) selecting a treatment fluid comprising a diverting agent (A) in a flaked form, for example guar gum in a flaked form. (ii) introducing the treatment fluid into the subterranean formation via the well-bore to plug a region of the formation. Thereafter, the formation may be fractured or re-fractured.

28 Claims, 1 Drawing Sheet

(56) References Cited

U.S. PATENT DOCUMENTS

| | | | |
|---|---|---|---|
| 2011/0015100 A1* | 1/2011 | Sun | C09K 8/685 |
| | | | 507/211 |
| 2012/0285692 A1* | 11/2012 | Potapenko | E21B 43/26 |
| | | | 166/308.1 |
| 2015/0041132 A1* | 2/2015 | Nelson | C09K 8/508 |
| | | | 166/280.1 |
| 2015/0072901 A1* | 3/2015 | Samuel | C09K 8/516 |
| | | | 507/104 |
| 2015/0083423 A1* | 3/2015 | Brannon | E21B 43/305 |
| | | | 166/292 |

* cited by examiner

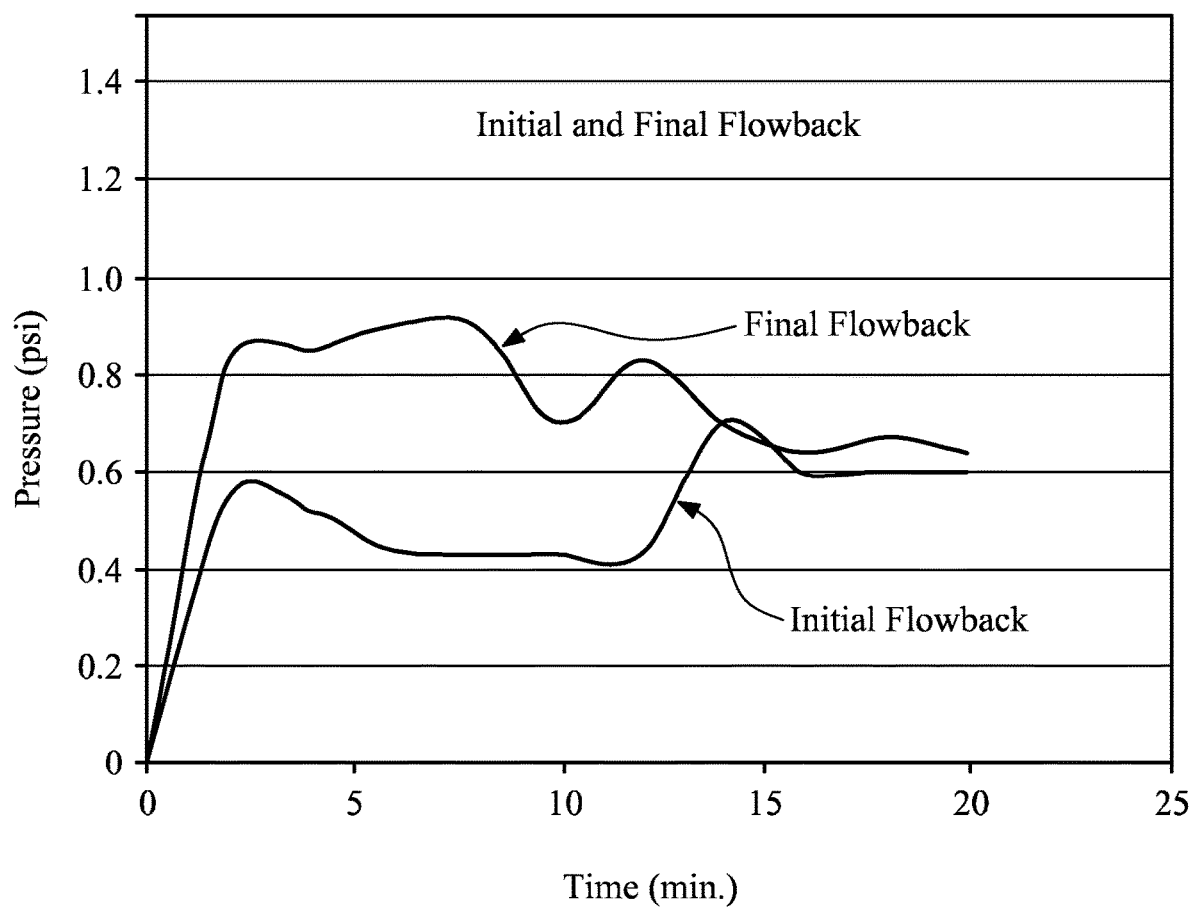

METHOD FOR MAKING A TREATMENT FLUID COMPRISING A DIVERTING AGENT IN FLAKE FORM, AND METHOD OF TREATING A WELL

TECHNICAL FIELD

This invention relates to fluids and methods using same. Particularly, although not exclusively, the invention relates to a method of treating a subterranean formation, a treatment fluid for use in the method and a method of making such a fluid. Preferred embodiments relate to use of a treatment fluid to facilitate fracturing of a subterranean formation.

BACKGROUND

Hydraulic fracturing is a process needed to produce oil and gas from unconventional reservoirs such as coal beds, tight sandstones and shales. In this process, a fracturing fluid is injected at rates and pressures necessary to cause formation failure by inducing fractures or cracks in the formation. These cracks originate through perforations at the well-bore and radiate out into the formation. A perforation is produced by a projectile fired from a perforating tool to create a hole through a well-bore steel casing and cement casing and into the formation, a distance 6 to 8 inches from the casing. Common practice in unconventional reservoirs is to initiate entry into the reservoir through the perforation with a small slug of acid pumped at a low rate followed by low viscosity water pumped at increasing rates until a desired high rate (typically from 50 to 100 barrels per minute) is achieved. In order to pump at these high rates, normally, small amounts of friction reducers are added to the fluid. These friction reducers are normally 120 to 1,000 ppm polyacrylamide polymers or copolymers.

Once a desired rate is achieved, a small loading of propping agent or proppant is added to the pumped fluid. Typically, most proppant comprises small-sized sand such as 0.25 pounds of 100 mesh sand per gallon of water. As a treatment proceeds, the amount of, for example, sand is systematically increased and, at some point, the size of the sand may be increased to, for example, 40/70 or 30/50 mesh. The purpose of the sand is to form a sand pack in the fracture which is orders of magnitude more permeable than the formation strata. The sand pack is then able to maintain a conductive pathway from the reservoir to the well-bore for the recovery of the reservoir fluids. Also, it is expected that the perforations in the casing are eroded. In the treatment, a perforation tunnel between the casing and the fracture is packed with proppant to produce a permeable pathway into the well-bore. Sand concentrations will normally range from 200,000 lb to 500,000 lb per fracturing stage and the water can range from 2,000 to 7,000 barrels of water.

However, the placement of transverse fractures along a horizontal lateral of a well often leaves large regions of the reservoir adjacent the well-bore untreated, these regions being poorly fractured or poorly propped. Consequently, they contribute little or nothing to the overall oil and gas production. Such untreated regions may have initially been by-passed because of the stage intervals being excessively long or, during attempted fracturing, the treatment design may have been inadequate or relevant regions of the formation may not have taken the treating fluid.

Once a well has produced for some period of time, it may be decided to re-fracture the reservoir, particularly those regions of the formation that were poorly stimulated initially. These regions can be identified using various forms of well logging. However, re-injection of fracturing fluids, with expectations of stimulating previously untreated regions of the reservoir, is difficult without the ability to seal off those perforations that are conveying most of the production from the reservoir. To address this problem, it is desirable to introduce a temporary blocking or sealing material (a "diverting agent") that could prevent re-injection of fracturing fluid into the most productive perforations. Once such productive perforations are sealed, treatment fluids can be injected through perforations that are less or non-productive in an effort to stimulate those regions of the reservoir. In some cases, once the most productive perforations are sealed, a new set of perforations can be formed, starting at the toe of the well and systematically working toward the heel while employing zonal isolation methods such as sliding sleeves or "plug and perf" processes.

In other cases, it may be desirable to inject intermittent slugs of diverting agent at lower pumping rates, while monitoring the pressure. Each time there is a pressure bump or increase after landing the diverting agent, the pumping rate on the fluid is increased to force open a new set of perforations, followed by an appropriate treating fluid volume and proppant concentration needed to fracture one or multiple zones. This is normally followed by another flush stage containing another slug of diverting agent to seal off that latest set of perforations. The fracturing stage and flush with diverting agent is repeated multiple times until the entire interval has been fractured as a means of stimulating production from previously un-fractured portions of the reservoir.

There are several requirements needed for a diverting agent. Firstly, a diverting agent should have an ability to block fluid flow at a concentration that can be operationally managed. For example 10 lb to 1,000 lb of diverting agent per 1,000 gal of treating fluid, but more commonly 20 lb to 500 lb of diverting agent per 1,000 gal of treating fluid and, most common, between 50 lb and 200 lb of diverting agent per 1,000 gal of treating fluid, may be used.

A diverting agent is suitably carried by injection fluid from the surface to those perforations receiving the fluid. Usually, there is a number of perforations accepting fluid flow in a non-uniform manner; some perforations may accept high volumes of fluid and others significantly less volumes. Since the diverting agent is added to the fluid on surface, those perforations accepting the most fluid will also be those perforations initially accepting the largest amount of diverting agent until the fluid flow through that perforation is blocked.

Secondly, a diverting agent suitably possesses some method of blocking fluid flow once a sand pack is established, such as the agent being malleable or deformable. In this mechanism, addition of pressure, sometimes influenced by temperature, will cause the product to pack and deform to block any further fluid flow, this then terminating the permeability in the flow channel.

Another important requirement for a diverting agent is easy removal to allow continued recovery of oil and gas from previously fractured portions of the well, in addition to the newly fractured portions, to enhance ultimate recovery of oil and gas from the reservoir. This may involve self-degradation of the diverting agent. Alternatively, a mixture of diverting agent and a degrading composition may be used, with the requirement that the degrading substance becomes part of the diverting pack. It will also be important that any degrading substance does not perform immediately, but slowly over a period of time that allows other portions of the reservoir to be stimulated. It may be necessary that the diverting agents be replenished periodically.

SUMMARY

It is an object of preferred embodiments of the present invention to provide an advantageous and/or cost-effective method of treating a subterranean formation to facilitate fracturing previously untreated regions of the formation.

BRIEF DESCRIPTION OF THE FIGURES

Specific embodiments of the invention will now be described, by way of example, with reference to:

FIG. 1 which is a graph showing baseline and final pressure of a filter cake incorporating diverting formulation over time.

DETAILED DESCRIPTION

According to a first aspect of the invention, there is provided a method of treating a subterranean formation penetrated by a well-bore, the method comprising the steps of:

(i) selecting a treatment fluid comprising a diverting agent (A) in a flaked form;

(ii) introducing the treatment fluid into the subterranean formation via the well-bore to plug a region of the formation.

Said diverting agent (A) is suitably in the form of a flake which is, when in a dehydrated state, a solid 3D object having a thickness smaller than its other dimensions, for example its length and width. At least 50% (preferably at least 90%) of the number of flakes of diverting agent (A) (when in dehydrated form) have a first aspect ratio defined as the width/thickness of at least 2, preferably at least 5; and/or a second aspect ratio defined as the length/thickness of at least 5, preferably at least 10. The first aspect ratio may be less than 50. The second aspect ratio may be less than 200 or less than 100.

When diverting agent (A) is in a dehydrated form, at least 90 wt % of the total weight of diverting agent (A) in the treatment fluid will not pass through a sieve having US mesh size 70. Suitably, at least 50 wt % (e.g. at least 60 wt %) will not pass through a sieve having US mesh size 40. Suitably, at least 20 wt % will not pass through a sieve having US mesh size 25.

Said diverting agent (A), in dehydrated form, suitably has a D10 of at least 500 µm and suitably less than 3000 µm, for example in the range 750 to 2000 µm; and/or a D50 of at least 100 µm and suitably less than 1500 µm, for example in the range 200 to 1100 µm; and/or a D90 of at least 100 µm and less than 1000 µm, for example in the range 150 to 600 µm, wherein D10, D50 and D90 may be assessed by sieve analysis as hereinafter described.

The majority (i.e. >50 wt %) of flakes of said diverting agent (A) may have a dimension in one direction in the range 0.1 mm to 100 mm, suitably in the range 0.1 mm to 25 mm, preferably in the range 0.5 mm to 15 mm, more preferably in the range 1.0 mm to 15 mm.

The majority (i.e. >50 wt %) of flakes of said diverting agent may have a dimension in one direction in the range 100 µm to 3000 µm, preferably in the range 150 µm to 2500 µm and, more preferably, in the range 200 µm to 2000 µm.

Said flakes suitably comprise particles which have not been ground.

Said diverting agent (A) is preferably a polysaccharide. It is preferably a degradable polysaccharide. It may be degradable on acidification.

Preferably, said diverting agent (A) is a polysaccharide which may be selected from starch and a polysaccharide gum, for example locust bean gum, tara gum, cassia gum and fenugreek gum.

Said diverting agent (A), for example said polysaccharide, is preferably not derivatised. That is, suitably, a naturally-occurring polysaccharide (e.g. guar) is not treated to derivatise the polysaccharide by covalent bond formation between the naturally-occurring material and another reagent.

Said diverting agent (A) preferably comprises guar gum in a flaked form.

Said treatment fluid is preferably aqueous. Said treatment fluid suitably includes at least 40 wt %, preferably at least 50 wt %, more preferably at least 70 wt %, especially at least 80 wt % water.

Said treatment fluid may, disregarding any proppant that may be included in the fluid, include at least 50 wt %, suitably at least 60 wt %, preferably at least 70 wt %, more preferably at least 80 wt %, especially at least 90 wt % water.

Water in said treatment fluid may be derived from any convenient source. It may be potable water, surface water, sea water, brine, flow-back water, aquifer water or produced water. References herein to amounts of water, particularly in the context of water which forms part of said treatment fluid described, suitably refer to water inclusive of components present in the source of water, such as dissolved salts found in sea water.

Said treatment fluid may include a viscosifying agent which is suitably arranged to suspend particulates in the treatment fluid. The viscosifying agent may comprise any crosslinked polymer. The viscosifying agent may be a metal-crosslinked polymer. Suitable polymers for making a metal-crosslinked polymer viscosifier include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make the viscosifying agent better suited for use in high-temperature wells, for example for carrying solids (e.g. proppant or other diverting agents) in the treatment of subterranean formations.

Other suitable classes of polymers effective as viscosifying agents include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof. Cellulose derivatives, such as hydroxyethylcellulose (HEC) or hydroxypropylcellulose (HPC), carboxymethylhydroxyethylcellulose (CMHEC) and carboxymethylcellulose (CMC), may be used, with or without crosslinkers, as may xanthan, diutan, and scleroglucan.

In said treatment fluid, a ratio (I), defined as the weight of diverting agent (A) divided by the weight of viscosifying agent on a dry matter basis, is suitably at least 1, is preferably at least 2 and, more preferably, is at least 3. Ratio (I) may be less than 50, less than 30, less than 20, less than 10 or less than 8.

In a preferred embodiment said viscosifying agent comprises a cross-linked polysaccharide, for example a cross-linked guar gum. Said polysaccharide, for example guar gum is preferably non-derivatised. Said viscosifying agent, for example said polysaccharide (especially guar gum) may be cross-linked by a boron-based cross-linker.

Said treatment fluid may further comprise a diverting agent (B) which, suitably, is in a particulate form, at least at the beginning of step (ii) of the method that is, suitably, the diverting agent (B) is not wholly dissolved in the treatment fluid and/or is suspended in the treatment fluid.

Said diverting agent (B) may be arranged to produce acid, for example after decomposition. Diverting agent (B) may comprise, preferably consist essentially of a polyester. Diverting agent (B) may be selected from polyesters obtained by polymerization of hydroxycarboxylic acids, such as the aliphatic polyester of lactic acid, referred to as polylactic acid; glycolic acid, referred to as polyglycolic acid; 3-hydroxybutyric acid, referred to as polyhydroxybutyrate; 2-hydroxyvaleric acid, referred to as polyhydroxyvalerate; epsilon caprolactone, referred to as polyepsilon caprolactone or polyprolactone; the polyesters obtained by esterification of hydroxylaminoacids such as serine, threonine and tyrosine; and the copolymers obtained by mixtures of the monomers listed above. A general structure for the above-described homopolyesters is: H—{O—[C(R1,R2)]x—[C(R3,R4)]y—C=O}z—OH where, R1, R2, R3, R4 is either H, linear alkyl, such as CH3, CH2CH3 (CH2)nCH3, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others); x is an integer between 1 and 11; y is an integer between 0 and 10; and z is an integer between 2 and 50,000.

In the appropriate conditions (pH, temperature, water content) polyesters like those described herein can hydrolyze and degrade to yield hydroxycarboxylic acid.

Other forms of polyesters include those made by the polymerization of polycarboxylic monomers with polyhydric monomers such as oxalic acid polymerized with ethylene glycol, or citric acid polymerized with ethylene glycol, so that on hydrolysis, an acid is produced that increases the fluid acidity.

A preferred diverting agent (B) is a polymer of lactic acid, suitably a polylactic acid (PLA), polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000).

Said diverting agent (B) is preferably polylactic acid.

In said treatment fluid, a ratio (II) defined as the weight of diverting agent (A) divided by the weight of diverting agent (B) may be in the range 1:5 to 5:1, preferably in the range 1:3 to 3:1, more preferably in the range 1:2 to 2:1.

When said treatment fluid includes a viscosifying agent as described, a ratio (C), defined as the weight of diverting agent (B) divided by the weight of viscosifying agent on a dry matter basis, is suitably at least 1, is preferably at least 2 and, more preferably, is at least 3. Ratio (C) may be less than 20, less than 10 or less than 8.

Said treatment fluid selected in step (i) may have a pH greater than 7, suitably greater than 8, preferably greater than 9, more preferably greater than 9.5. The pH may be less than 12 or less than 10.

Said treatment fluid may be arranged to define a sealing composition which is introduced into the subterranean formation in the method. The method preferably comprises allowing the treatment fluid to form a degradable seal in the subterranean formation. Preferably, the treatment fluid is arranged to degrade by a change in pH of the fluid over time, for example by degradation of diverting agent (B), when provided, that, in turn degrades diverting agent (A).

The method of the first aspect suitably comprises a method of hydraulic stimulation of the subterranean formation. The method may comprise introducing the treatment fluid into a first fracture in the formation, suitably so the treatment fluid containing diverting agent, at least partially hydraulically isolates the first fracture. Subsequently, the subterranean formation may be stimulated with a stimulation fluid (e.g. a fracturing fluid) sufficient to create and/or extend a second fracture within the formation. The resulting diverting agent seal (produced by fluid introduced into the first fracture) may then degrade, for example due to a pH change within the fluid. As a result, at least some of the fluid introduced flows from the first fracture into the wellbore.

The method may comprise introducing treatment fluid into at least 2, preferably at least 3 or at least 4 fractures. After said introduction, at least 2 or at least 3 other fractures may be created and/or expanded.

The method may comprise repeating step (ii) a multiplicity of times (e.g. at least 3, 4 or 5 times).

At some stage in the method, a said treatment fluid introduced into the formation in step (ii) may include one or a plurality of proppants. The proppant may have a size of at least 140 US mesh; it may have a size of less than 5 US mesh. The proppant may be selected from sand, bauxite, and man-made intermediate or high strength materials.

At some stage in the method, a said treatment fluid introduced into the formation in step (ii) includes at least 2.9 wt %, for example at least 5 wt %, of proppants. Higher percentages of proppants may be used as a treatment progresses.

In a preferred embodiment, said treatment fluid includes guar flakes.

There may be several advantages associated with use of diverting agent (A), especially guar flakes, including a beneficial interaction with fracturing fluids, the ability to make dense packs with relatively small concentrations that effectively seal off fluid entry through productive perforations, an ability to self-degrade in high temperature environments and an ability to degrade with the inclusion of other degrading substances at lower temperatures.

The size of the flakes as described which may have a wide particle size distribution may be advantageous. For example, the guar flakes (being much larger than, for example, guar gum powder), will not readily hydrate to form a polymer solution.

Although the guar flakes will not hydrate and form a solution, they will absorb water immediately when added to a water based fluid and swell to become microgel particles. The rate and degree of swelling are controlled by both the water temperature and the acidity or alkalinity of the water. Lower water temperatures and water pH above 9.0 suppress the rate and amount of water that can be absorbed. The degree of swelling can be 1 to 15 times more than the initial size, more commonly between 1.2 and 10 times and, most commonly, between 1.5 and 5 times the initial size.

In a swollen state, the guar flakes in a treatment fluid become very malleable so that when the treatment fluid is pumped through a perforated casing, the fluid will flow past the casing and into existing fractures through the most productive perforations, or those having the least resistance to flow. As the treatment fluid containing the swollen guar flakes flows through the perforations, the swollen flakes may filter out of the fluid, for example, onto a sand pack in a perforation tunnel and build a pack of multi-sized particles that blend together to build an impermeable pack of high density guar polymer. The pressures commonly exerted when pumping the treatment fluid (eg between 500 and 20,000 psi, but more commonly between 1000 and 15,000 psi and most commonly between 3,000 and 12,000 psi), may cause partial dehydration of the pack, increasing the polymer density of the pack.

Once the pack is formed in a perforation, the perforation is sealed or plugged and further fluid flow through the perforation is stopped. This causes the treatment fluid flow to divert to the next set of perforations to repeat the plugging process. Each time a perforation is plugged, there will be a pressure increase in the casing. Eventually, when a number of perforations are plugged, there will be a noticeable pressure increase that is recordable on the surface. This pressure increase is the primary means of identifying the degree of success of the treatment.

The fluid formulation may be pumped in multiple slugs until the expected pressures are observed. Guar flakes may be introduced at 5 to 500 lb per 1000 gal in 1000 gal increments, but more commonly between 10 and 200 lb per 1000 gal and most commonly between 25 and 100 lb per 1000 gal in 1000 gal increments.

The pump rate needed to place the fluid formulation should be such as to prevent plugging of surface pumping equipment, to add the required amount of diverting agent in a prescribed period of time and to respond to rapid pressure increases once the formulation is placed in perforation tunnels. The rate can range from 1 to 100 bbl/min, more commonly between 5 and 50 bbl/min and, most commonly, between 6 and 30 bbl/min.

One additional advantage of use of flakes, especially guar flakes, over other diverting agents is the flakes' ability to become part of the treatment fluid when a cross-linkable treatment fluid is used. Swollen guar flakes may be included in a treatment fluid containing low concentrations of hydrated guar gum. Then, when the pH is increased above 9.0 and borate crosslinking agents are added, for example at concentrations ranging from 0.75 to 1.5 gal per 1000 gal, the guar flake will participate as part of the cross-linked gel structure.

In some known treatment fluids, diverting agents can separate from the fluid when pumped at low rates, so that some perforations will be treated with higher concentrations of diverting agent whereas others will be treated with less. In this case, perforations on the bottom of a casing of a horizontal well may receive a higher proportion of the diverting agent than those at the top of the casing; or, perforations closest to a vertical section may receive more diverting agent than perforations near the toe.

In contrast, by using a treatment fluid in accordance with preferred embodiments of the invention, all perforations taking fluid receive near equal amounts of diverting agent (A), based on the amount of fluid flowing through each perforation. Consequently, the amount of diverting agent (A) introduced provided is not dependent on the perforation location. This may provide better utilization of the diverting agent (A) and a more systematic response to the treatment.

In addition to placement advantages, diverting agent (A), for example guar flakes, can be readily removed to restore previous production after treatment. A guar pack may be thermally degraded in wells above 275° F. (135° C.) so that no external degrading substance may be needed. At lower temperatures, it may be necessary to pump a fluid into the well after treatment to remove the guar-containing plugs. The best options will depend on the well temperature. In wells below 180° F. (82° C.), guar degradable enzymes may be effective.

Another option is to pump solid, slow dissolving guar degrading substances with the guar flakes so that the guar degrading substances becomes part of the diverting plug that can, at a later time, degrade the plug. For temperatures below 200° F., one preferred substance is encapsulated persulfate such as Innospec Oilfield Services GelBrake 250.

At temperatures above 200° F. (93° C.) it may be advantageous to pump the guar flakes with degradable polyester solids such as polylactic acid (PLA) as described above as diverting agent (B). The PLA is a self-degrading polymer. Using this ability, mixing small amounts of the PLA with the guar flakes allows the resulting lactic acid formed by PLA hydrolysis to degrade the guar polymer by acid hydrolysis. In this application, the guar flakes are found to be more efficient in building the diverting pack than PLA, but will rely on the PLA as a degrading agent that also has the added benefit of providing diversion. Typical amounts of PLA mixed with the guar flakes depends on the amount of guar flakes and temperature but ranges in a ratio of PLA to guar from 0.05:1.00 to 1.00:1.00.

In a preferred embodiment, said treatment formulation selected in step (i) comprises:

0.25 to 5 parts by weight (pbw) (e.g. 0.5 to 3 wt %) of diverting agent (A) which consists of guar flakes;

0.25 to 5 pbw (e.g. 0.5 to 3 wt %) of diverting agent (B) which consists of polylactic acid;

water.

Said treatment fluid preferably includes:

0.5 to 5 parts by weight (pbw) (e.g. 0.5 to 3 wt %) of diverting agent (A) which consists of guar flakes;

0.5 to 5 pbw (e.g. 0.5 to 3 wt %) of diverting agent (B) which consists of polylactic acid;

water;

0.1 to 1pbw (e.g. 0.1 to 1 wt %) of polymer which is cross-linked to define said viscosifying agent; wherein preferably said polymer which is cross-linked comprises guar.

Said treatment formulation preferably includes at least 50pbw (e.g. at least 50 wt %) of water).

Said treatment formulation may include at least 2.5pbw (e.g. at least 2.5 wt %) of proppant. Said treatment formulation may include 0 to 60 pbw, suitably 2.5 to 60 pbw (e.g. 0 to 60 wt %, preferably 5 to 60 wt %) of proppant.

In the method, one stage may comprise introducing a diverting agent (A) as described and another stage may involve introducing a formulation including a proppant.

The method may be used to divert fluid and proppant in both new wells (completions) and in old wells in a re-fracturing mode.

When used during formation of new wells, longer stage intervals may be defined and diverters used throughout the fracturing treatment to block initially developed fracture patterns and force the fracturing fluid into different portions of that same interval. So, as an example, if by use of diverters, the interval length can be extended to 400 ft instead of a typical length of say 120 ft in the same lateral, then the number of plugs needed can be reduced to about 13 by use of diverters, from 42 when diverters are not used. Thus, use of diverters as described leads to a saving in both time and money.

The invention extends to a method of fracturing a subterranean formation, the method comprising:
 introducing said treatment fluid into the subterranean formation via the well-bore to plug a region of the formation;
 fracturing said formation to produce a fracture in a region of said formation different to said region which is plugged by said treatment fluid;
 wherein after said fracturing said treatment fluid which plugs the region is at least partially removed.

According to a second aspect of the invention, there is provided a treatment fluid comprising a diverting agent (A) in a flaked form.

The treatment fluid may have any feature of the treatment fluid described in the first aspect.

According to a third aspect of the invention, there is provided a method of making a treatment fluid, the method comprising:
 (a) selecting a diverting agent (A) as described according to the first aspect;
 (b) selecting a diverting agent (B) as described according to the first aspect;
 (c) selecting a viscosifying agent or a precursor of a viscosifying agent as described according to the first aspect;
 (d) contacting diverting agent (A) and diverting agent (B) with the viscosifying agent or said precursor of said viscosifying agent.

In step (c), preferably a precursor is selected and, preferably, said precursor is a polymer, for example a cross-linkable polymer, for example a polysaccharide, especially a guar gum.

The method preferably includes the step of contacting said precursor with a cross-linking agent, for example a metal-based cross-linking agent, for example a boron-based material.

The method preferably includes the step of adjusting the pH of the treatment fluid, for example increasing the pH, suitably to a pH of at least 8, at least 9 or at least 9.8. The pH may be increased to a level which is less than 12 or less than 11.

The method may include the step of incorporating one or more proppants into the treatment fluid.

Any feature of any aspect of any invention described herein may be combined with any feature of any other aspect of any invention described herein mutatis mutandis.

WORKING EXAMPLES

Specific embodiments of the invention will now be described, by way of example, with reference to FIG. 1 which is a graph showing baseline and final pressure of a filter cake incorporating diverting formulation over time.

The following materials are referred to hereinafter:

Guar flakes—an intermediate produced in the processing of guar gum. After a guar split or endosperm has been isolated, it is treated with tempering water to cause the split to be more malleable. The swollen split is then sent through a cylinder mill composed of two cylinders in contact with one another and turning in opposite directions. The extruding forces on the split cause it to elongate into a fiber or flake-like appearance. The flake is dried and isolated without grinding.

A sieve analysis of multiple samples of the guar flakes was undertaken and results are provided in Table 1.

TABLE 1

| Sieve Size | Sample 1 % of Total | Sample 2 % of Total | Sample 3 % of Total | Sample 4 % of Total | Average % of total |
|---|---|---|---|---|---|
| 7 | 0.0% | 0.0% | 0.0% | 0.0% | 0.0% |
| 8 | 0.0% | 0.0% | 0.0% | 0.0% | 0.0% |
| 10 | 0.7% | 0.7% | 0.0% | 0.0% | 0.3% |
| 20 | 23.0% | 19.5% | 19.2% | 22.1% | 20.9% |
| 25 | | 14.1% | 14.4% | 15.9% | 14.8% |
| 35 | 44.6% | 28.2% | 27.4% | 29.0% | 32.3% |
| 40 | 9.5% | 11.4% | 11.0% | 9.7% | 10.4% |
| 60 | 12.8% | 18.1% | 15.1% | 13.8% | 15.0% |
| 70 | 2.7% | 3.4% | 3.4% | 2.8% | 3.1% |
| PAN | 6.8% | 4.7% | 9.6% | 6.9% | 7.0% |

The analysis also yielded the following results in Table 2 for the flake dimensions, where Dxx refers to the size D (in inches or μm as specified) for which xx percent of the sample by weight passes a sieve mesh with an opening equal to D. For example, D50 is called the median grain size and is the grain diameter for which half the sample (by weight) is smaller and half is larger.

TABLE 2

| Parameter | Inches | n |
|---|---|---|
| D5 | 0.0687690 | 1747 |
| D10 | 0.0569517 | 1447 |
| D40 | 0.0263619 | 670 |
| D50 | 0.0235238 | 598 |
| D90 | 0.0105733 | 269 |
| D95 | 0.008435 | 214 |

In addition, the lengths of the guar flakes (the length being the maximum dimension) were found to be in the range 2.00 mm to 12.00 mm.

Polylactic acid (PLA) particles—PLA having a melting point in the range 150 to 180° C. and a specific gravity of 1.28 gcm$^{-3}$.

The particle size distribution of the PLA used was as detailed in Table 3

TABLE 3

| US Mesh | Millimeters (mm) | Percent of Total (%) |
|---|---|---|
| 6 | 3.360 | 0.20 |
| 8 | 2.380 | 10.50 |
| 12 | 1.680 | 50.70 |
| 20 | 0.841 | 22.30 |
| 35 | 0.500 | 12.60 |
| 50 | 0.297 | 2.70 |
| Pan | | 1.00 |

Guar gum—3540 grade guar gum. The 3540 grade means that a 0.48% solution of guar gum in an aqueous solution of 2% potassium chloride when mixed at 2,000 rpm in a Waring™ blender for 2 min will show a 35 cP viscosity at 511 sec$^{-1}$ in 3 min on a Fann 35 (R1B1) viscometer and 40 cP in 60 min.

VisLink 200—borate-based cross-linking solution available from Innospec Oilfield Services.

In the following examples, example 1 demonstrates the diverting potential of a mixture of guar flakes and polylactic acid in a fracture void of any proppant pack; example 2 uses guar flakes and polylactic acid at lower concentrations compared to Example 1; example 3 is a comparative example, using only polylactic acid; example 4 describes a diversion test using a sand-pack to illustrate plugging of perforation tunnels. Example 5 demonstrates the diverting agent is temporary and does not cause long-term damage to the perforation tunnel, the proppant pack or the subterranean formation A diverting mixture was composed of 1.5 g of guar flakes and 1.5 g of polylactic acid (PLA) particles, each being as described above.

EXAMPLE 1

A test was conducted to demonstrate the diverting potential of a mixture of guar flakes and polylactic acid particles using a tapered, slotted Teflon™ plug to simulate a mature fracture adjacent a well-bore. The slot was manufactured from a 5 cm diameter by 7 cm length Teflon™ plug. The slot dimensions were 0.318 cm wide on the inlet side of the plug (top) and 0.079 cm wide on the outlet. The slot was also 4 cm in length and 7 cm deep. The Teflon™ plug also contained two O-rings, one on top and the other on the bottom of the cylinder to seal the Teflon™ plug in a 5.08 cm diameter high temperature, high pressure fluid loss cell. The top end cap of the cell was designed for easy removal and the bottom end-cap was fitted with a stem that allows flow when opened and no flow when closed. The cell was placed in a heating jacket during the test and the fluid in the cell was pressured with nitrogen gas.

A diverting mixture was composed 1.5 g of guar flakes and 1.5 g of polylactic acid (PLA) particles, each being as described above.

The diverting mixture comprising guar flakes and PLA particles was mixed into a 250 ml hydrated guar polymer solution composed of 0.45 g of guar gum in tap water using a 1 L Waring blender, with shearing at 1000 rpm. The alkalinity of the solution was immediately increased after adding the diverting agents to pH 10.1 with 25 wt % sodium hydroxide solution. Then, 0.31 ml of a borate-based cross-linking solution (VisLink 200) was added and mixed for 90 sec with gelation and poured into the high temperature and high pressure fluid loss cell containing the tapered slotted Teflon™ plug. The cell end-cap was replaced and sealed and the bottom stem closed. The cell was then placed into the heating jacket and heated to about 200° F. (93° C.). Once at this temperature, the bottom stem was opened, allowing fluid to flow through the slot and out the stem. To seal the slot required three 250 ml aliquots (each referred to as a "cycle" in the results which follow).

TABLE 4

| Cycles | Time | Temp (° F.) | Fluid Vol (ml) | Effluent Vol (ml) | Pressure (psi) | Cumulative Diverting Agents (g) | pH before/ after |
|---|---|---|---|---|---|---|---|
| 1 | 11:45 | 204 | 250 | 230 | 0 | 2.76 | 9.20/8.50 |
| 2 | 1:30 | 200 | 250 | 210 | 300 | 5.28 | 9.20/8.58 |
| 3 | 2:30 | 200 | 250 | 150 | 1000 | 7.08 | 9.29/8.5] |

The results show that, after 590 ml of the fluid had been introduced (3.54 g each of the guar flakes and PLA), a pressure of 1000 psi could be applied to the Teflon™ slot without fluid flow through the cell at 200° F. (93° C.). The pH change was also noteworthy as an indicator that the polylactic acid was starting to decompose, creating lactic acid, needed to hydrolyze the guar gum.

EXAMPLE 2

The process described in Example 1 was repeated, except that the amounts of guar flakes and polylactic acid described in Example 1 were reduced from 1.5 g of each to 0.75 g of each. Again, the diverting mixture comprising guar flakes and PLA was added to a 0.45 g hydrated guar polymer solution in 250 ml tap water and mixed with a Waring blender. Once the diverting mixture had been mixed into the polymer solution, the alkalinity was increased to pH 10.20 with 25 wt % sodium hydroxide solution. Then 0.31 ml of borate cross-linker (VisLink 200) was added with cross-linking occurring in about 90 sec. The gel was then poured into the high temperature, high pressure cell, containing the tapered slotted Teflon™ plug. Again, like Example 1, multiple aliquots (cycles) were required. Results are provided in Table 5.

TABLE 5

| Cycles | Time | Temp (° F.) | Fluid Vol. (ml) | Effluent Vol (ml) | Pressure (psi) | Cumulative Diverting Agent (g) | pH before/ after |
|---|---|---|---|---|---|---|---|
| 1 | 11:05 | 205 | 250 | 230 | <25 | 1.38 | 9.20/8.99 |
| 2 | 11:25 | 204 | 250 | 220 | 200 | 2.70 | 9.20/8.91 |
| 3 | 1:30 | 205 | 250 | 250 | 1000 | 4.20 | 9.20/8.92 |

The results show that, after 700 ml (2.10 g each of the guar flakes and PLA) had flowed through the slot, a pressure of 1000 psi could be applied to the Teflon™ slot, without further fluid flow through the cell at 205° F. (96° C.). The pH change was also noteworthy as an indicator that the polylactic acid had started to decompose, creating lactic acid, needed to hydrolyze the guar gum.

EXAMPLE 3 (COMPARATIVE)

The process described in Example 1 was repeated, except that only polylactic acid described in Example 1 was used as a diverting agent (and no guar flakes were used). Varying concentrations of the PLA, as shown in Table 6, were added to a 0.45 g hydrated guar polymer solution in 250 ml tap water. Once the PLA was mixed into the polymer solution, the alkalinity was immediately increased to pH 10.20 with 25 wt % sodium hydroxide solution. Then 0.31 ml of borate cross-linker (VisLink 200) was added with cross-linking occurring in about 90 sec. The gel was then poured into the high temperature, high pressure cell, containing the tapered slotted Teflon™ plug. Again, like Example 1, multiple aliquots (cycles) were required. Results are provided in Table 6.

TABLE 6

| Cycles | Comments | Time | Temp (° F.) | Fluid Vol. (ml) | Effluent Vol (ml) | Pressure (psi) | Cumulative Diverting Agent (g) | PH before/ after |
|---|---|---|---|---|---|---|---|---|
| 1 | 0.75 g PLA | 11:05 | 205 | 250 | 250 | <25 | 0.75 | 9.6/ 9.35 |
| 2 | 1.50 g PLA | 11:30 | 200 | 250 | 250 | <25 | 2.25 | 9.5/ 9.14 |
| 3 | 1.50 g PLA | 11:47 | 206 | 250 | 250 | <25 | 3.75 | 9.6/ 9.15 |
| 4 | 1.50 g PLA | 1:00 | 206 | 250 | 250 | <25 | 5.25 | 9.6/ 9.21 |

TABLE 6-continued

| Cycles | Comments | Time | Temp (° F.) | Fluid Vol. (ml) | Effluent Vol (ml) | Pressure (psi) | Cumulative Diverting Agent (g) | PH before/ after |
|---|---|---|---|---|---|---|---|---|
| 5 | 1.50 g PLA | 1:40 | 200 | 250 | 250 | 50 | 6.75 | 9.6/ |

The results show that polylactic acid alone is not as efficient as a mixture comprising guar flakes and polylactic acid in blocking flow through the slot. PLA alone could only withstand about 50 psi pressure. This pressure would practically be far too low to enable hydraulic fracturing fluid to be diverted to new regions of the formation.

EXAMPLE 4

In this example, a diversion test was conducted by replacing the slotted Teflon™ plug with a sand pack. It is expected that, in some instances, it will be necessary to divert hydraulic fracturing fluid from one set of sand-filled perforations to another set of perforations, allowing new regions of a formation to be hydraulically fractured. In this test, the high temperature, high pressure cell was again used.

In the test, 250 g of 40/70 US Mesh fracturing sand or proppant (near spherical and well-rounded), commonly used in the fracturing of shale reservoirs, was weighed and set aside. A 100 mesh screen was installed in the bottom end-cap of the fluid loss cell and the stem closed. The cell was placed in the heating jacket, although the jacket was initially at room temperature. Then 250 ml of tap water was poured into the cell. Next, 250 g of frac sand was poured into the water in the cell, with the bottom stem slightly open to allow the water to drain, forming a 5.0 to 7.6 cm water-saturated sand plug, resting on the 100 mesh screen in the bottom of the cell. Once the water level was at the top of the sand pack, the stem was closed. A diverting formulation was poured from the top of the cell. The end-cap was replaced on the cell and it was then heated to 180° F. (82° C.). Formulations assessed are described below with reference to Table 7.

Nitrogen pressure was slowly applied to the cell after opening the bottom stem. The diverting agent was expected to plug the sand pack, preventing fluid to flow from the bottom stem. The objective for a successful test was to maximize the pressure contained above the diverting agent filter cake. Ideally, the pressure should hold a 1,000 psi pressure or as much as 1,500 psi at temperature. To achieve this pressure differential, the cell may need to be reloaded with 250 ml aliquots of fresh diverting agent-laden fluid. Once the desired pressure was obtained, the pressure was held for 24 hour or until the pressure leaked off. The maximum pressure, the effluent volume captured from the bottom stem and the time was recorded. From the volume of effluent, the amount of diverting agent was calculated.

The diverting formulation used comprised 0.36 g of guar polymer hydrated in tap water in a Waring blender. A diverting agent mixture comprising guar flakes and PLA particles, as detailed in Table 7, was added to the hydrated fluid and the alkalinity increased to pH 10.20 with 25 wt % sodium hydroxide. The concentration of flakes and PLA is shown in Table 7. Then, 0.25 ml of borate cross-linker (VisLink 200), was added, with crosslinking occurring in about 90 sec. The diverting formulation was then poured from the top of the cell and the test continued.

Results are presented in Table 7.

TABLE 7

| Guar Flakes (g/250 ml) | PLA (g/250 ml) | Temp. (° F.) | Pressure (psi) | Total Effluent* (ml) | Number of 250 ml Aliquots | Sand Size (Mesh) |
|---|---|---|---|---|---|---|
| 0.75 | 0.75 | 200° F. | 1050 | 780 | 4 | 40/70 |
| 0.75 | 0.75 | 184° F. | 1000 | 1082 | 5 | 20/40 |
| 1.50 | 1.50 | 200° F. | 1200 | 819 | 4 | 40/70 |
| 2.25 | 2.25 | 200° F. | 1150 | 465 | 2 | 40/70 |
| 3.00 | 3.00 | 200° F. | 1200 | 550 | 3 | 40/70 |

The results show that the diverting formulation comprising guar flakes and PLA can hold adequate pressure, exceeding 1000 psi, with very low concentrations of guar flakes and PLA.

Also, the test shown in the second row is conducted with the larger 20/40 mesh frac sand and still shows that diversion with guar flakes is effective even for larger proppant.

EXAMPLE 5

In addition to plugging either fractures as illustrated by Examples 1 and 2, on perforation tunnels as illustrated by Example 4, the plug introduced must also degrade and clean-up to prevent or minimize any post-treatment flow impairment from the formation to the well-bore. In this example a test is conducted to show the plug formed can degrade and clean-up with time at temperature.

A filter cake test utilizing bi-directional flow was performed with a high temperature, high pressure fluid loss cell, using a porous ceramic disc having a 12 μm pore diameter as the filtering media. The cell was sealed after filling with 2% potassium chloride (KCl) and a 2% KCl in tap water solution was injected in the bottom of the cell, through the ceramic disc at 5 ml/min and discharged from the top of the cell. This represents the production direction to simulate flow from the reservoir to the well. The pressure over time is recorded and used as the baseline or reference before any potential damage occurs.

The diverting formulation used was composed of 0.45 g of guar gum hydrated in 250 ml of tap water using a Waring™ blender to mix the fluid. Then 1.5 g of guar flakes and 1.5 g polylactic acid described in Example 1 were added to the guar polymer solution. The alkalinity was immediately increased to pH 10.20 with 25 wt % sodium hydroxide solution. The fluid was then cross-linked with 0.31 ml of a borate cross-linker (VisLink 200), with gelation occurring in about 90 sec. The cross-linked fluid was added to the top of the cell, the end-cap replaced, the cell pressured to 500 psi with nitrogen gas with the bottom stem open and the cell heated to 200° F. (93° C.) for 24 hours. This simulated the injection direction of chemical injected into the formation via the well-bore. At the end of the 24 hour period, the stem was closed and the cell was cooled to room temperature; after cooling, the cell was opened to pour off the excess diverting fluid. The cell was again filled with 2 wt % KCl and sealed by replacing the end-cap. Then 2 wt % KCl was again injected in the production direction, from the bottom of the cell at 5.0 ml/min while recording pressure. Although the pressure was initially higher than the baseline pressure, after about 15 min of flow, the initial and final pressures converged at about 0.6 psi, suggesting about 89.7% regain permeability of the disc. Although after opening the cell, there were remnants of filter cake material in the 2 wt % KCl solution, the 89.7% regain permeability suggested good clean-up of the filter cake and the diverting agents were capable of degradation after treatment to assure minimal flow impairment between the formation and the well-bore. FIG. 1 shows the baseline and final pressure after filter cake degradation over time.

Thus, it should be appreciated from the above that the combination of guar flakes and PLA provides an advantageous diverting agent. The materials may be included in a treatment formulation which includes other additives.

The invention claimed is:

1. A method of treating a subterranean formation penetrated by a well-bore, the method comprising the steps of:
   (i) selecting a treatment fluid comprising a diverting agent (A) in a flaked form; and
   (ii) introducing the treatment fluid into the subterranean formation via the well-bore to plug a region of the formation;
   wherein said diverting agent (A) comprises guar gum in a flaked form, wherein said guar gum in a flaked form is derived from guar splits or endosperm.

2. The method according to claim 1, wherein said guar gum in a flaked form is prepared without grinding.

3. The method according to claim 1, wherein said treatment fluid includes at least 40 wt % water.

4. The method according to claim 1, further comprising removing the diverting agent (A) by addition of a guar degrading substance at a temperature of below 200° F.

5. The method of claim 1, wherein, at some stage in the method, said treatment fluid introduced into the formation in step (ii) includes one or a plurality of proppants.

6. A method of treating a subterranean formation penetrated by a well-bore, the method comprising the steps of:
   (i) selecting a treatment fluid comprising a diverting agent (A) in a flaked form; and
   (ii) introducing the treatment fluid into the subterranean formation via the well-bore to plug a region of the formation;
   wherein said diverting agent (A) comprises guar gum in a flaked form which comprises guar endosperm.

7. The method according to claim 6, wherein at least 50% of the number of flakes of diverting agent (A) when in dehydrated form have a first aspect ratio defined as the width/thickness of at least 2 and a second aspect ratio defined as the length/thickness of at least 5.

8. The method according to claim 6, wherein said diverting agent (A), in dehydrated form, has a D10 of at least 500 μm and less than 3000 μm; and/or a D50 of at least 100 μm and less than 15000 μm.

9. The method according to claim 6, wherein said treatment fluid includes at least 40 wt % water.

10. The method according to claim 6, wherein said treatment fluid includes a viscosifying agent arranged to suspend particulates in the treatment fluid.

11. The method according to claim 10, wherein said viscosifying agent is a metal-cross-linked polymer.

12. The method according to claim 10, wherein said viscosifying agent comprises a cross-linked polysaccharide.

13. The method according to claim 10, wherein said viscosifying agent comprises a cross-linked guar gum.

14. The method according to claim 6, further comprising removing the diverting agent (A) by addition of a guar degrading substance at a temperature of below 200° F.

15. The method according to claim 6, which includes treatment with a guar degrading substance.

16. The method according to claim 6, wherein said treatment fluid further comprises a diverting agent (B).

17. The method according to claim 16, wherein said diverting agent (B) is arranged to produce acid after decomposition.

18. The method according to claim 16, wherein said diverting agent (B) comprises a polyester.

19. The method according to claim 16, wherein said diverting agent (B) is polylactic acid.

20. The method according to claim 16, wherein, in said treatment fluid, a ratio (II) defined as the weight of diverting agent (A) divided by the weight of diverting agent (B) is in the range 1:5 to 5:1.

21. The method of claim 6, wherein said treatment fluid selected in step (i) has a pH greater than 7 and less than or equal to 12.

22. The method of claim 6, wherein said treatment fluid is arranged to define a sealing composition which is introduced into the subterranean formation in the method.

23. The method of claim 6, wherein the method is used to divert fluid and proppant in a new well.

24. The method of claim 6, wherein the method is used to divert fluid and proppant in an old well in a re-fracturing mode.

25. The method of claim 6, which further comprises hydraulically stimulating the subterranean formation.

26. The method of claim 6, wherein, at some stage in the method, said treatment fluid introduced into the formation in step (ii) includes one or a plurality of proppants.

27. A method of treating a subterranean formation penetrated by a well-bore, the method comprising the steps of:
   (i) selecting a treatment fluid comprising a diverting agent (A) in a flaked form; and
   (ii) introducing the treatment fluid into the subterranean formation via the well-bore to plug a region of the formation;
   wherein said diverting agent (A) comprises guar gum in a flaked form, wherein said guar gum in a flaked form comprises guar endosperm;
   wherein at least 50% of the number of flakes of diverting agent (A) when in dehydrated form have a first aspect ratio defined as the width/thickness of at least 2 and a second aspect ratio defined as the length/thickness of at least 5;
   wherein said treatment fluid includes at least 40 wt % water.

28. The method according to claim 27, wherein said treatment fluid includes a viscosifying agent arranged to suspend particulates in the treatment fluid, wherein said viscosifying agent comprises a cross-linked polysaccharide.

* * * * *